(12) United States Patent
Asagiri et al.

(10) Patent No.: US 6,305,633 B1
(45) Date of Patent: Oct. 23, 2001

(54) WEBBING TAKE-UP DEVICE

(75) Inventors: Katsuki Asagiri; Akira Sumiyashiki, both of Aichi-ken (JP)

(73) Assignee: Kabushiki Kaisha Tokai-Rika-Denki-Seisakusho (JP)

( * ) Notice: Subject to any disclaimer, the term of this patent is extended or adjusted under 35 U.S.C. 154(b) by 0 days.

(21) Appl. No.: 09/535,014

(22) Filed: Mar. 24, 2000

(30) Foreign Application Priority Data

Apr. 9, 1999 (JP) ................................................ 11-102635

(51) Int. Cl.⁷ ............................ B60R 22/38; B65H 75/48
(52) U.S. Cl. ...................................... 242/383.2; 242/383.5
(58) Field of Search ............................ 242/383.2, 383.5, 242/384.6; 280/806; 297/478

(56) References Cited

U.S. PATENT DOCUMENTS

| | | | |
|---|---|---|---|
| 4,506,844 | * | 3/1985 | Ernst .................................. 242/107.4 |
| 4,509,707 | * | 4/1985 | Ernst et al. ........................ 242/107.4 |
| 4,619,418 | * | 10/1986 | Butenop ............................. 242/107.4 |
| 4,749,144 | * | 6/1988 | Maeno et al. ...................... 242/107.4 |
| 4,834,313 | * | 5/1989 | Tsukamoto ......................... 242/107.4 |
| 4,858,847 | * | 8/1989 | Ogris ................................. 242/107.4 |
| 4,991,790 | | 2/1991 | Fohl et al. . |
| 5,332,291 | * | 7/1994 | Fujimura et al. ..................... 297/480 |
| 5,368,251 | * | 11/1994 | Haberzeth ......................... 242/382.6 |
| 5,482,224 | * | 1/1996 | Fujimura et al. ..................... 242/376 |
| 5,660,347 | | 8/1997 | Baker . |
| 5,779,177 | * | 7/1998 | Keilwein ........................... 242/382.6 |
| 5,921,496 | * | 7/1999 | Matsuki et al. .................... 242/383.2 |
| 6,068,208 | * | 5/2000 | Matsuki et al. .................... 242/383.2 |

FOREIGN PATENT DOCUMENTS

| | | | |
|---|---|---|---|
| 3421960-A1 | * | 12/1985 | (DE) . |
| 140366-A | * | 10/1984 | (EP) . |
| 63-956 | | 1/1988 | (JP) . |
| 63-21173 | | 2/1988 | (JP) . |
| 1-168354 | | 11/1989 | (JP) . |
| 4-46962 | | 4/1992 | (JP) . |
| 6-37021 | | 5/1994 | (JP) . |
| 2 310 786 | | 9/1997 | (JP) . |
| 10-230817 | | 9/1998 | (JP) . |
| WO-82/03991 | * | 11/1982 | (WO) . |

* cited by examiner

*Primary Examiner*—Donald P. Walsh
*Assistant Examiner*—David A Jones
(74) *Attorney, Agent, or Firm*—Nixon Peabody LLP; Thomas W. Cole (57) ABSTRACT

There is provided a webbing take-up device of which weight can be reduced while maintaining lock strength. A single lock plate which is engaged with an internal gear ratchet at the time of sudden deceleration of a vehicle is held in an accommodating portion formed in a holding portion of a base lock. At the time of sudden deceleration of a vehicle, the lock plate is moved by being guided in a guide hole of a V gear and is engaged with the internal gear ratchet. Further, reaction force generated in the above-described engagement is utilized and the holding portion of the base lock is caused to contact by pressure the internal gear ratchet and the base lock plastically deforms and is thereby engaged with the internal gear ratchet. Accordingly, the base lock and the internal gear ratchet are in a locked state at two facing locations on the base lock in a radial direction of the base lock. In addition, since only one lock plate is used, the weight of the device can be reduced while maintaining the lock strength thereof.

10 Claims, 9 Drawing Sheets

WEBBING TAKE-UP DEVICE

BACKGROUND OF THE INVENTION

1. Field of the Invention

The present invention relates to a webbing take-up device equipped with locking means which prevents rotation of a winding shaft in a direction in which a webbing is pulled out at the time of sudden deceleration of a vehicle.

2. Description of the Related Art

Figure 9:
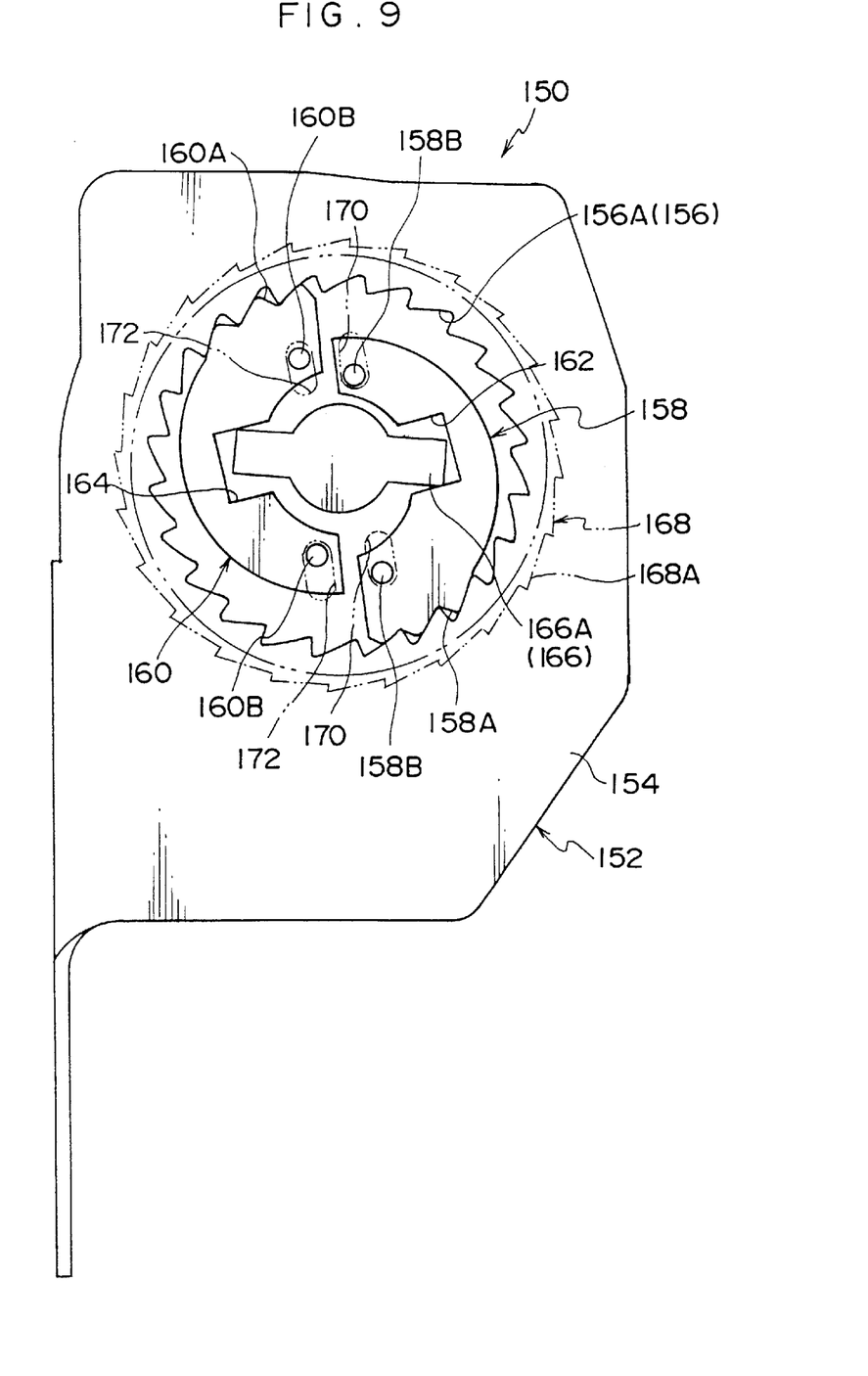
FIG. 9 is a side view which schematically shows a locking structure of a conventional webbing take-up device.

FIG. 9 schematically shows a locking structure of a conventional webbing take-up device 150. As illustrated in this figure, the webbing take-up device 150 includes a frame 152 and the frame 152 is fixed to the side of a vehicle body. An internal gear ratchet 156 is formed in a leg plate 154 which is one of leg plates provided in the frame 152. At the side of an inner periphery of the internal gear ratchet 156, a pair of lock plates 158 and 160 each having a substantially crescent-shaped plate are disposed in such a manner as to be substantially point-symmetrical about the center of the internal gear ratchet 156. Locking teeth 158A and 160A are formed respectively in portions of outer peripheries of the lock plates 158 and 160 and face a ratchet gear 156A of the internal gear ratchet 156.

Further, engagement concave portions 162 and 164 are formed respectively in intermediate portions of the pair of lock plates 158 and 160, and a branched portion 166A of a winding shaft 166 projecting from an axial core portion of the internal gear ratchet 156 is disposed in the engagement concave portions 162 and 164.

Moreover, a V gear 168 rotating by following the winding shaft 166 is provided at a position adjacent to the internal gear ratchet 156. Lock teeth 168A are formed in the outer periphery of the V gear 168, and four guide holes 170 and 172 are formed substantially at ends of an axial core portion of the V gear 168. A pair of projections 158B projecting from the lock plate 158 and a pair of projections 160B projecting from the lock plate 160 are inserted respectively in the guide holes 170 and the guide holes 172.

According to the above-described structure, when sudden deceleration of a vehicle is detected by an acceleration sensor (not shown), a pawl of a sensor lever of the acceleration sensor is engaged with the lock tooth 168A of the V gear 168 to thereby prevent rotation of the V gear 168 in a direction in which a webbing is pulled out. For this reason, relative rotation is caused between the winding shaft 166 which is about to rotate in the direction in which the webbing is pulled out due to webbing tension generated by inertia movement of a vehicle occupant, and the V gear 168 which is prevented from rotating in the direction in which the webbing is pulled out. For this reason, the projections 158B and 160B are guided by the guide holes 170 and 172 of the V gear 168 (so as to respectively move in the guide holes 170 and 172), and the pair of lock plates 158 and 160 are moved in directions apart from each other to allow the lock teeth 158A and 160A to be engaged with the ratchet gear 156A of the internal gear ratchet 156. As a result, as illustrated in FIG. 9, the rotation of the winding shaft 166 in the direction in which the webbing is pulled out is prevented and the webbing take-up device is thereby placed in a locked state.

The above-described locking structure conventionally used widely is provided to maintain lock strength by using two lock plates 158 and 160. However, the number of parts increases for the reason that the two lock plates 158 and 160 are used, and an increase in the weight of the webbing take-up device 150 is thereby caused.

SUMMARY OF THE INVENTION

In view of the above-described facts, an object of the present invention is to provide a webbing take-up device of which weight can be reduced with lock strength thereof being maintained.

A first aspect of the present invention is a webbing take-up device comprising a frame supported at the side of a vehicle body, a winding shaft rotatably supported by the frame and taking up a vehicle occupant-restraining webbing, and locking means for preventing rotation of the winding shaft in a direction in which the webbing is pulled out at the time of sudden deceleration of a vehicle, the locking means including: a first lock portion disposed coaxially with the winding shaft and rotating by following the winding shaft, the first lock portion being prevented from rotating in a direction in which the webbing is pulled out at the time of sudden deceleration of the vehicle; a second lock portion disposed coaxially with the winding shaft and rotating integrally with the winding shaft, the second lock portion causing relative rotation between the first lock portion and the second lock portion when rotation of the first lock portion in the direction in which the webbing is pulled out is prevented; a third lock portion which is held by the second lock portion in such a manner as to be movable in a first direction, and when the relative rotation between the first and second lock portions is caused, which moves in the first direction, the third lock portion being comprised of a single component having lock teeth; a fourth lock portion provided in the frame and having lock teeth which are engaged with the lock teeth of the third lock portion when the third lock portion moves in the first direction; and a guide portion which, when the lock teeth of the third lock portion is engaged with the lock teeth of the fourth lock portion, utilizes reaction force generated by engagement between the lock teeth of the fourth lock portion and the lock teeth of the third lock portion so as to displace a predetermined portion of the second lock portion in a direction in which the second lock portion moves close to a predetermined portion of the fourth lock portion, thereby allowing engagement between the predetermined portion of the second lock portion and the predetermined portion of the fourth lock portion, wherein the first direction is that in which the lock teeth of the third lock portion moves close to the lock teeth of the fourth lock portion.

In accordance with a second aspect of the present invention, the predetermined portion of the fourth lock portion is a portion provided substantially symmetrical with an engaging portion of the fourth lock portion engaged with the lock teeth of the third lock portion with respect to a rotational axis of the second lock portion, and the predetermined portion of the second lock portion is provided to face the predetermined portion of the fourth lock portion.

In accordance with a third aspect of the present invention, the third lock portion is held by a holding portion formed in the second lock portion, the holding portion having a wide portion, and includes a protruding portion extending in a second direction at one end thereof and lock teeth at another end thereof, a dimension of the wide portion in the second direction is substantially equal to an overall dimension of a dimension of the protruding portion in the second direction and a dimension of the one end in the second direction, and the second direction is substantially perpendicular to the first direction.

In accordance with a fourth aspect of the present invention, the guide portion includes a bearing portion for supporting the second lock portion, and when the bearing portion deforms due to the reaction force, the guide portion allows the predetermined portion of the second lock portion to be engaged with the predetermined portion of the fourth lock portion.

In accordance with a fifth aspect of the present invention, each strength of the third lock portion and the fourth lock portion is greater than that of the second lock portion, and when the lock teeth of the third lock portion are engaged with the lock teeth of the fourth lock portion, the predetermined portion of the second lock portion plastically deforms so as to be engaged with the predetermined portion of the fourth lock portion.

According to the present invention, at the time of sudden deceleration of a vehicle, the first lock portion disposed coaxially with the winding shaft and rotating by following the winding shaft is prevented from rotating in the direction in which the webbing is pulled out. On the other hand, the second lock portion disposed coaxially with the winding shaft (the second lock portion is preferably plastically deformable) rotates integrally with the winding shaft, and therefore, the second lock portion is about to rotate together with the winding shaft in the direction in which the webbing is pulled out due to a tension acting on the webbing, which is caused by inertia movement of a vehicle occupant. Accordingly, relative rotation is caused between the first lock portion and the second lock portion. When the relative rotation is caused between the first and second lock portions, the third lock portion comprised of a single component and held by the second lock portion in such a manner as to be movable in the first direction (that is, substantially in a radial direction of the second lock portion) moves in the first direction. As a result, the lock teeth (preferably having high strength) of the third lock portion are engaged with the lock teeth (also preferably having high strength) of the fourth lock portion provided in the frame. Accordingly, the rotation of the winding shaft in the direction in which the webbing is pulled out is prevented and a so-called locked state is obtained.

Further, in the present invention, by utilizing reaction force generated when the lock teeth of the third lock portion are engaged with the lock teeth of the fourth lock portion, another engagement state can be obtained by the guide portion. Namely, when the lock teeth of the third lock portion are engaged with the lock teeth of the fourth lock portion, guide portion utilizes reaction force generated by engagement between the lock teeth of the fourth lock portion and the lock teeth of the third lock portion so as to displace a predetermined portion of the second lock portion in a direction in which the second lock portion moves close to a predetermined portion of the fourth lock portion. Further, due to the predetermined portion of the second lock portion being preferably deformed plastically, the predetermined portion of the second lock portion is directly engaged with the predetermined portion of the fourth lock portion. As a result, a locked state is obtained based on two facing positions in the radial direction of the second lock portion, and therefore, sufficient lock strength can be maintained.

Moreover, in the present invention, a lock portion which is a movable member (that is, the third lock portion) is, as described above, formed as a single component, and therefore, the number of parts can be reduced. Accordingly, as compared with the conventional structure in which two lock plates are used, the weight of the webbing take-up device can also be reduced.

DESCRIPTION OF THE PREFERRED EMBODIMENTS

A description will be hereinafter given of a webbing take-up device 10 according to an embodiment of the present invention with reference to FIGS. 1 to 8.

First, a spool 12 of the webbing take-up device 10 and a structure of parts integrated therewith will be described. Next, a locking structure which is a principal portion of the embodiment of the present invention will be described.

[Spool 12 and Structure of Parts Integrated Therewith]

Figure 1:
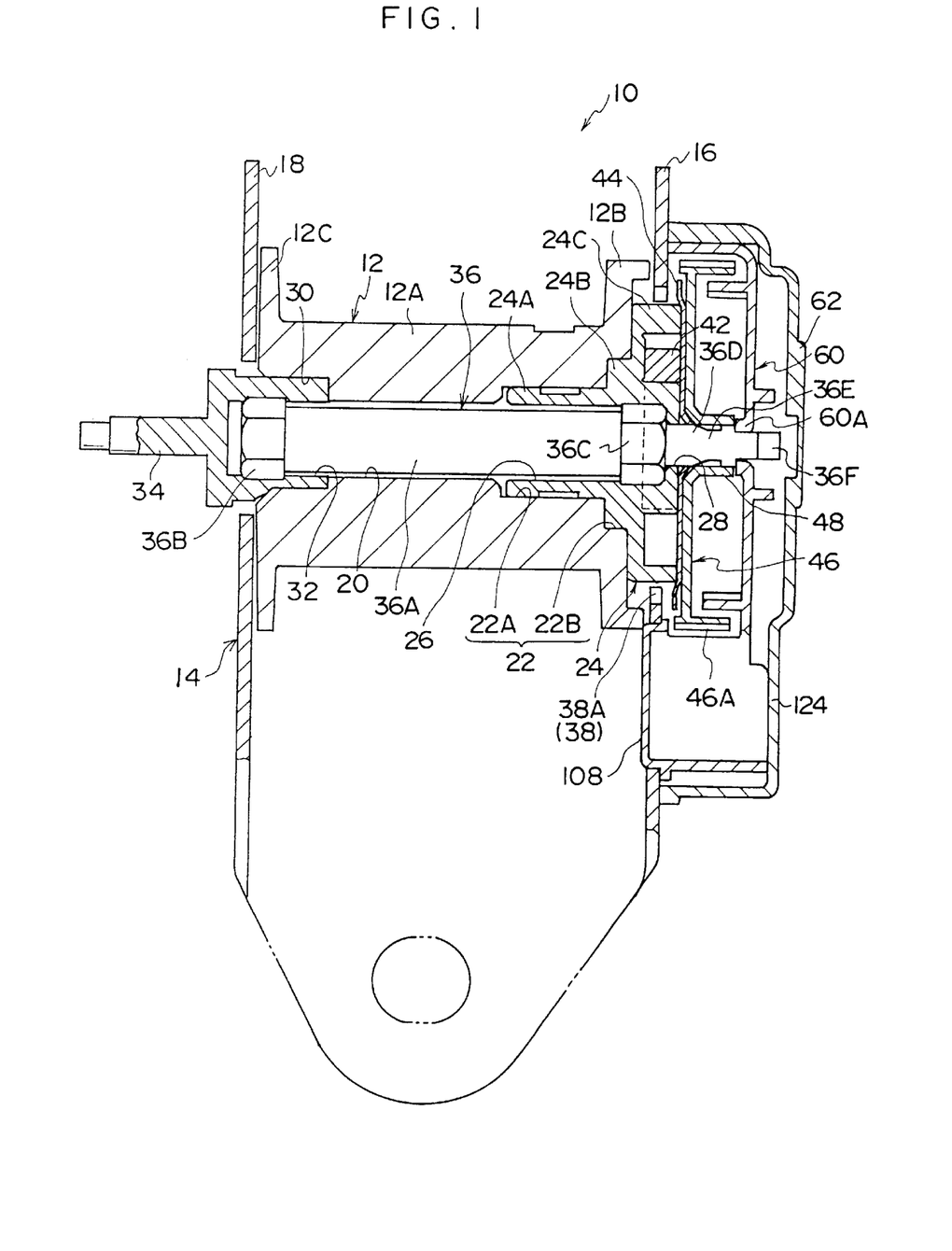
FIG. 1 is a longitudinal cross sectional view showing an overall structure of a webbing take-up device according to an embodiment of the present invention.

FIG. 1 shows a longitudinal cross section which shows an overall structure of the webbing take-up device 10 according to the embodiment of the present invention. As illustrated in this figure, the webbing take-up device 10 includes a frame 14 having a substantially U-shaped configuration when seen from the top, and the frame 14 is fixed to the side of a vehicle body. The frame 14 includes a first leg plate 16 and a second leg plate 18 extending therefrom parallel with each other. A spool 12 serving as a "winding shaft" formed by die casting is supported rotatably between the first leg plate 16 and the second leg plate 18.

The spool 12 is comprised of a cylindrical spool shaft 12A having an axial core portion, and a pair of flange portions which are each formed substantially in the shape of a hollow circular plate at each of both ends of the spool shaft 12A (a flange portion disposed at the side of the first leg plate 16 will be hereinafter referred to as "first flange portion 12B" and a flange portion disposed at the side of the second leg plate 18 will be hereinafter referred to as "second flange portion 12C"), and the spool 12 has, as a whole, a substantially hourglass-shaped configuration.

A shaft insertion hole 20 is formed in the axial core portion of the spool shaft 12A. A base lock receiving portion 22 of which diameter is larger than a hole diameter of a central portion of the shaft insertion hole 20 is provided in the shaft insertion hole 20 at the side of the first flange portion 12B, and is formed so as to be coaxial with the shaft insertion hole 20. The base lock receiving portion 22 is comprised of a main body 22A formed by the most part thereof, and an end portion 22B of which diameter is larger than the main body 22A.

A base lock 24 serving as "second lock portion" formed by die casting is mounted in the base lock receiving portion 22 in a state of being prevented from coming out from the base lock receiving portion 22. The base lock 24 is mounted in such a manner that after insertion of the base lock 24 into the base lock receiving portion 22, a stopper (not shown), serving as a come out preventing member, which has a substantially U-shaped configuration when seen from the front is pressed therein from a direction perpendicular to the axial line. Further, in the present embodiment, the base lock 24 is manufactured by die casting, but there is not necessarily need to use the die casting. As is clear from an operation and effects, which will be described later, it suffices that the base lock 24 may be formed of a material which, when the base lock 24 contacts by pressure ratchet teeth 38A at the time of sudden deceleration of a vehicle, can be engaged with the ratchet teeth 38A due to plastic deformation thereof.

The base lock 24 is formed in the shape of a cylinder of which outer peripheral diameter varies along the axial direction thereof. The base lock 24 is comprised of a base portion 24A fitted into the main body 22A of the base lock receiving portion 22, an intermediate portion 24B of which diameter is larger than an outer peripheral diameter of the base portion 24A and which is fitted into the end portion 22B of the base lock receiving portion 22, and a holding portion 24C of which diameter is larger than an outer peripheral diameter of the intermediate portion 24B and which is disposed in contact with an outer side surface of the first flange portion 12B. Further, an engagement hole 26 in the shape of a hexagon hole is formed in a portion of the axial core portion of the base lock 24, other than an outer end of the axial core portion (which end is located at the side of the holding portion 24C in the axial core portion of the base lock 24). Moreover, a small hole 28 of which diameter is smaller than the hole diameter of the engagement hole 26 is formed at the outer end of the axial core portion in such a manner as to communicate with the engagement hole 26.

A sleeve receiving portion 30 of which diameter is larger than a hole diameter of the central portion of the shaft insertion hole 20 is formed in the shaft insertion hole 20 of the spool shaft 12A at the side of the second flange portion 12C. A female spline is formed in an inner periphery of the sleeve receiving portion 30, and a sleeve 34 is fitted in the sleeve receiving portion 30. The sleeve 34 is formed in such a manner that a male spline is formed in the outer periphery thereof and an engagement hole 32 in the shape of a hexagon hole is formed in an axial core portion thereof. An inner end of urging means (power spring) for rotating and urging the spool 12 in a direction in which the webbing is taken up is engaged and fastened to an end of the sleeve 34 via an adapter (not shown). Further, the sleeve 34 having the above-described structure is one of parts of a pretensioner for rotating the spool 12 instantaneously with sudden deceleration of a vehicle.

Figure 4:
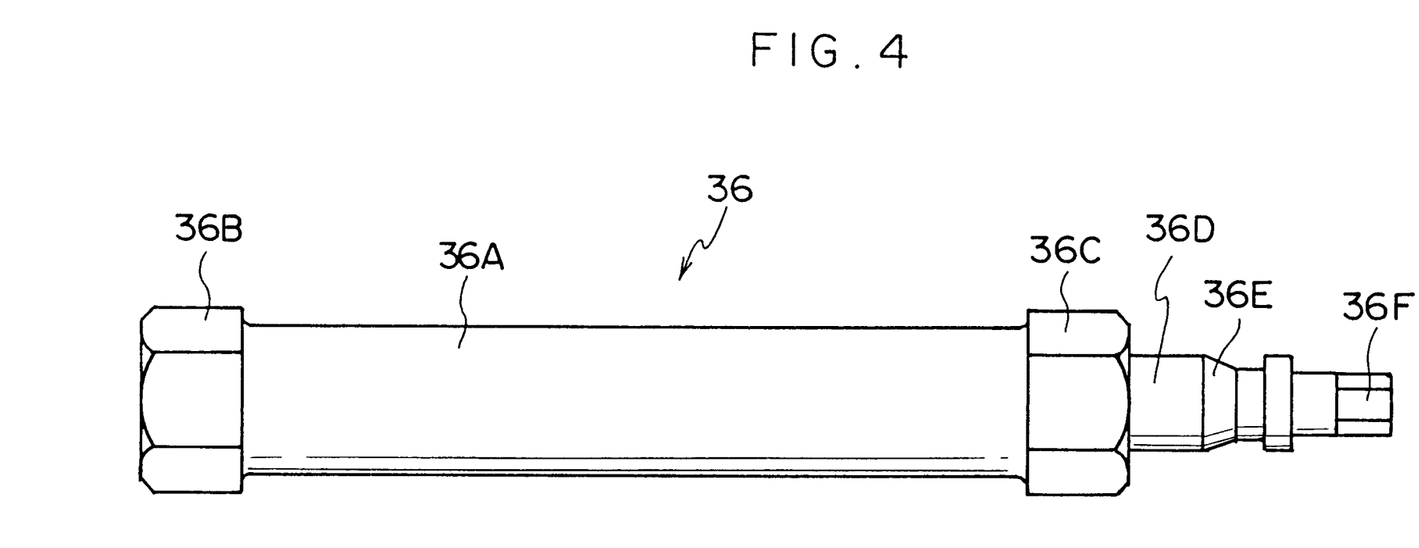
FIG. 4 is a front view of a torsion shaft shown in FIG. 1.
Figure 5:
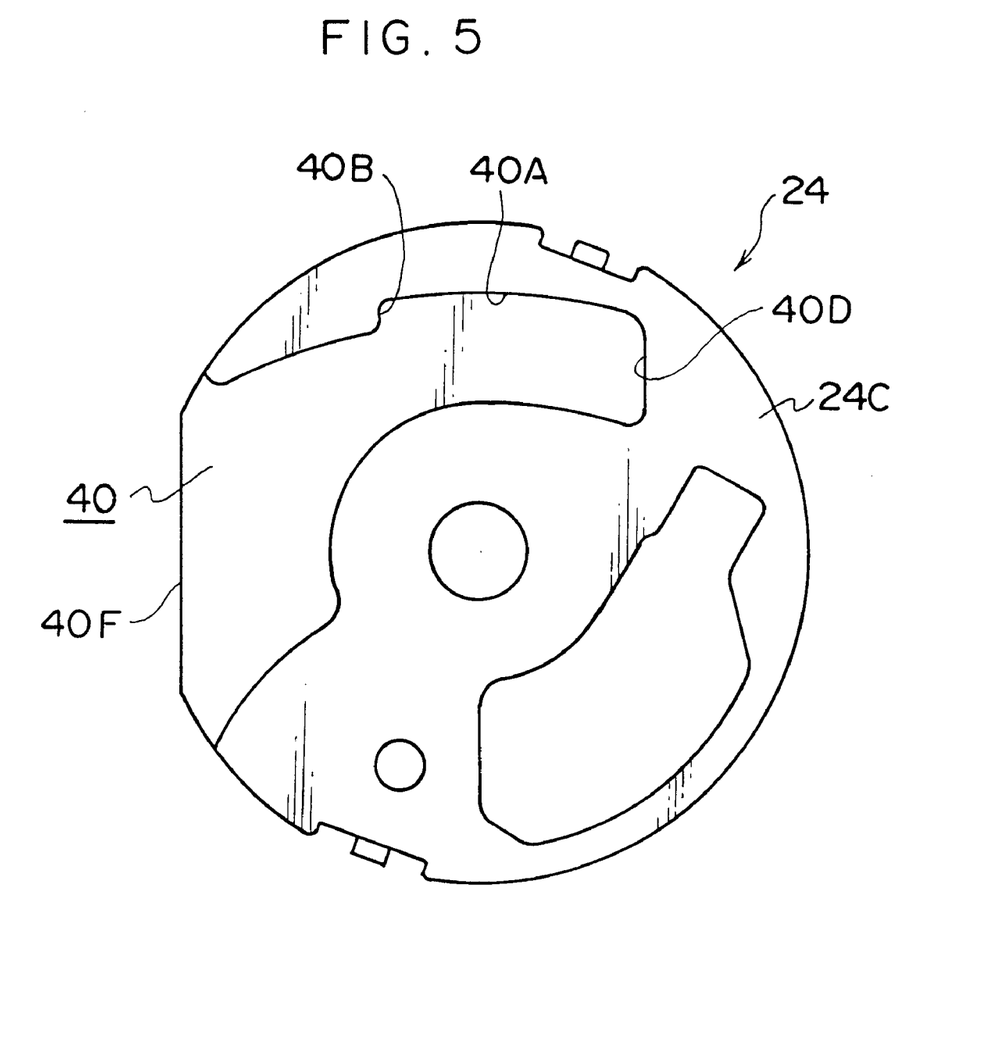
FIG. 5 is a side view of a base lock shown in FIG. 1.

The above-described base lock 24 and sleeve 34 are connected with each other by a torsion shaft 36. As also illustrated in FIG. 4, the torsion shaft 36 is comprised of a shaft portion 36A which forms a principal portion thereof, a hexagonal head portion 36B formed at one end of the shaft portion 36A, a hexagonal engaging portion 36C formed at another end of the shaft portion 36A, a small diameter portion 36D extending from an end of an axial core portion of the engaging portion 36C so as to be coaxial with the shaft portion 36A, a gear holding portion 36E extending from the small diameter portion 36D so as to be coaxial with the shaft portion 36A, and an end portion 36F extending from the gear holding portion 36E in such a manner as to be coaxial with the shaft portion 36A and having a key formed therein. The gear holding portion 36E further includes a tapered portion of which diameter is gradually reduced along an axial direction of the shaft, a diameter-reduced portion of which diameter is smaller than that of the small diameter portion 36D, and a diameter-enlarged portion of which diameter is larger than the diameter-reduced portion. Referring again to FIG. 1, the head portion 36B of the torsion shaft 36 is fitted in the hexagon hole-shaped engagement hole 32 formed in the sleeve 34 and the engaging portion 36C of the torsion shaft 36 is fitted in the hexagon hole-shaped engagement hole 26 formed in the base lock 24. As a result, the torsion shaft 36 is integrated with the spool shaft 12A via the base lock 24 and the sleeve 34. The torsion shaft 36 having the above-described structure is a principal component of a force limiter which, when a webbing tension having a predetermined value or more acts on the spool 12 at the time of sudden deceleration of a vehicle, is distorted and deforms so as to absorb energy.

[Locking Structure]

Figure 2:
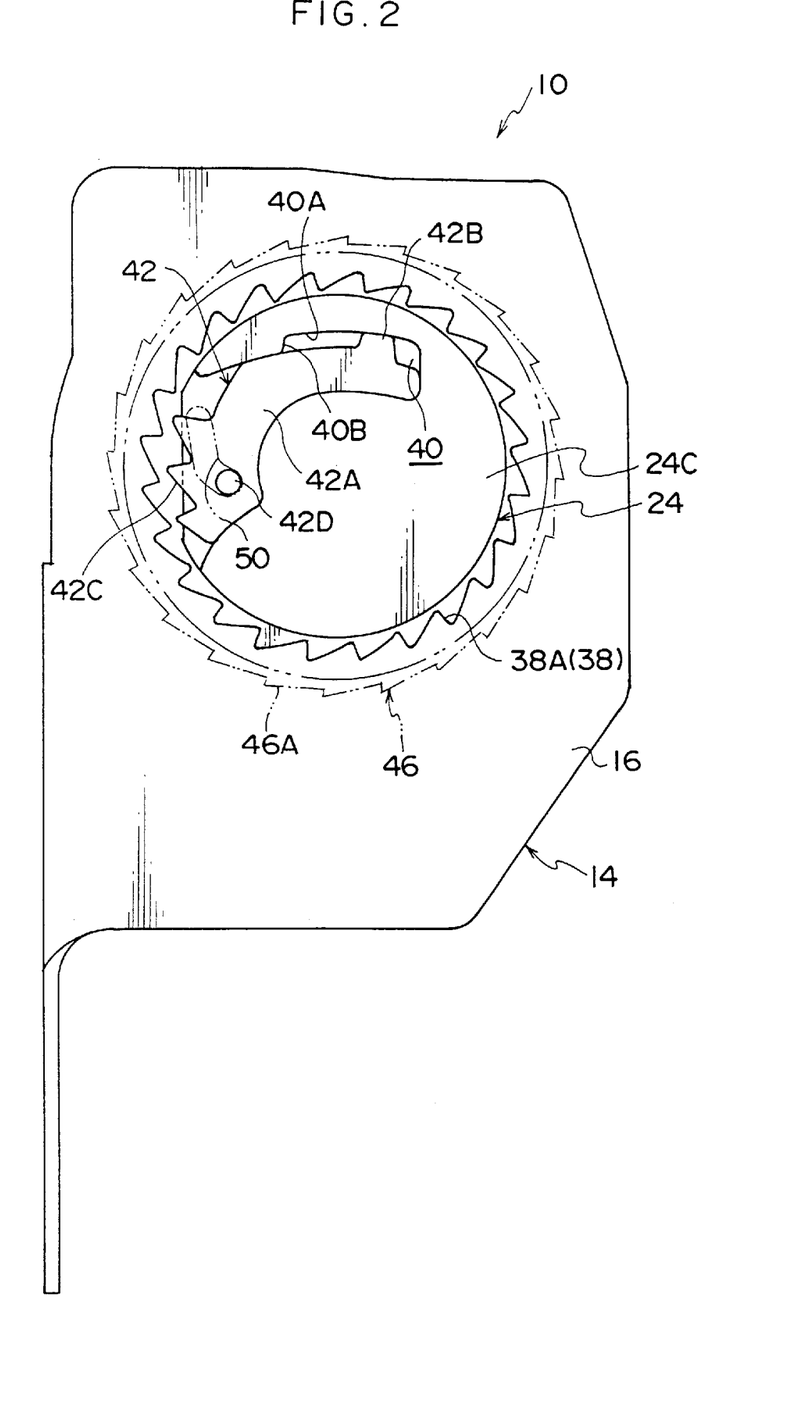
FIG. 2 is a side view showing the webbing take-up device according to the embodiment of the present invention in an unlocked state.
Figure 3:
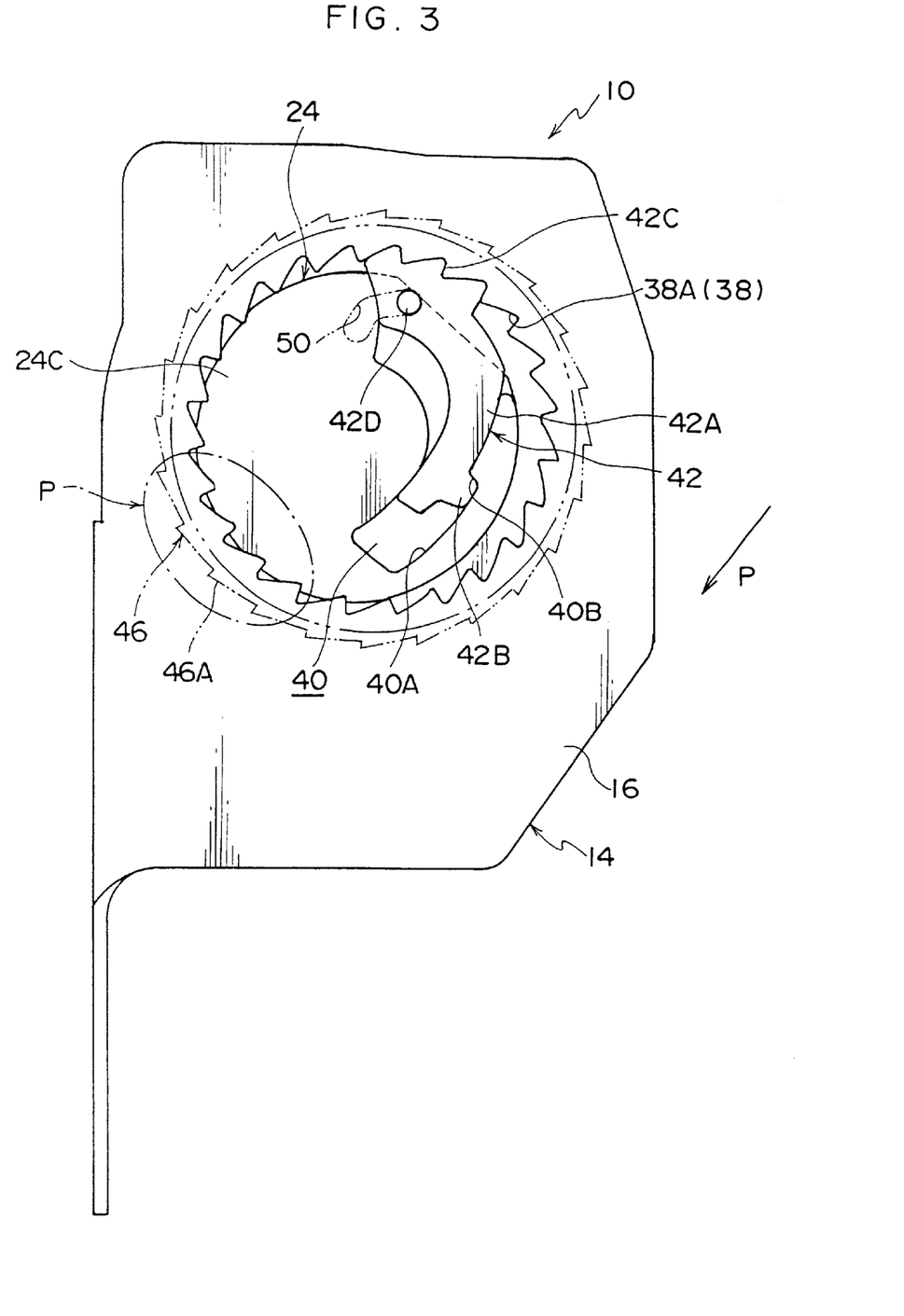
FIG. 3 is a side view showing the webbing take-up device according to the embodiment of the present invention in a locked state.

As illustrated in FIG. 2 and also in FIG. 3, an internal gear ratchet 38 serving as a "fourth lock portion" is formed by punching in an upper portion of the first leg portion 16 of the frame 14. Ratchet teeth 38A, which serve as "lock teeth", of the internal gear ratchet 38 are set so as to have a high strength.

The holding portion 24C of the base lock 24 is disposed at an inner side of the internal gear ratchet 38. The small diameter portion 36D of the torsion shaft 36 is inserted in the above-described small hole 28 formed at the end of the axial core portion of the holding portion 24C. A concave accommodating portion 40 (see FIGS. 2, 3, and 5) formed around the small hole 28 substantially in the shape of an arc along the outer periphery of the holding portion 24C is formed at the front side of the holding portion 24C (at an end of the holding portion 24C at the right side on the paper of FIG. 1). One end 40D of the accommodating portion 40 is closed and the other end is opened. The other end 40F of the accommodating portion 40 of the holding portion 24C in the base lock 24 is chamfered so as not to prevent engagement between a lock plate 42 with the internal gear ratchet 38, which will be described later. The accommodating portion 40 accommodates the lock plate 42 (see FIGS. 2, 3, and 6) serving as a single "third lock portion" having a substantially arc-shaped plate based on the shape of the accommodating portion 40. Further, a thin-walled lock cover 44 having the shape of a circular plate is mounted at an outer surface of the holding portion 24C of the base lock 24 in a state of stopping rotating so as to prevent falling of the lock plate 42.

Figure 6:
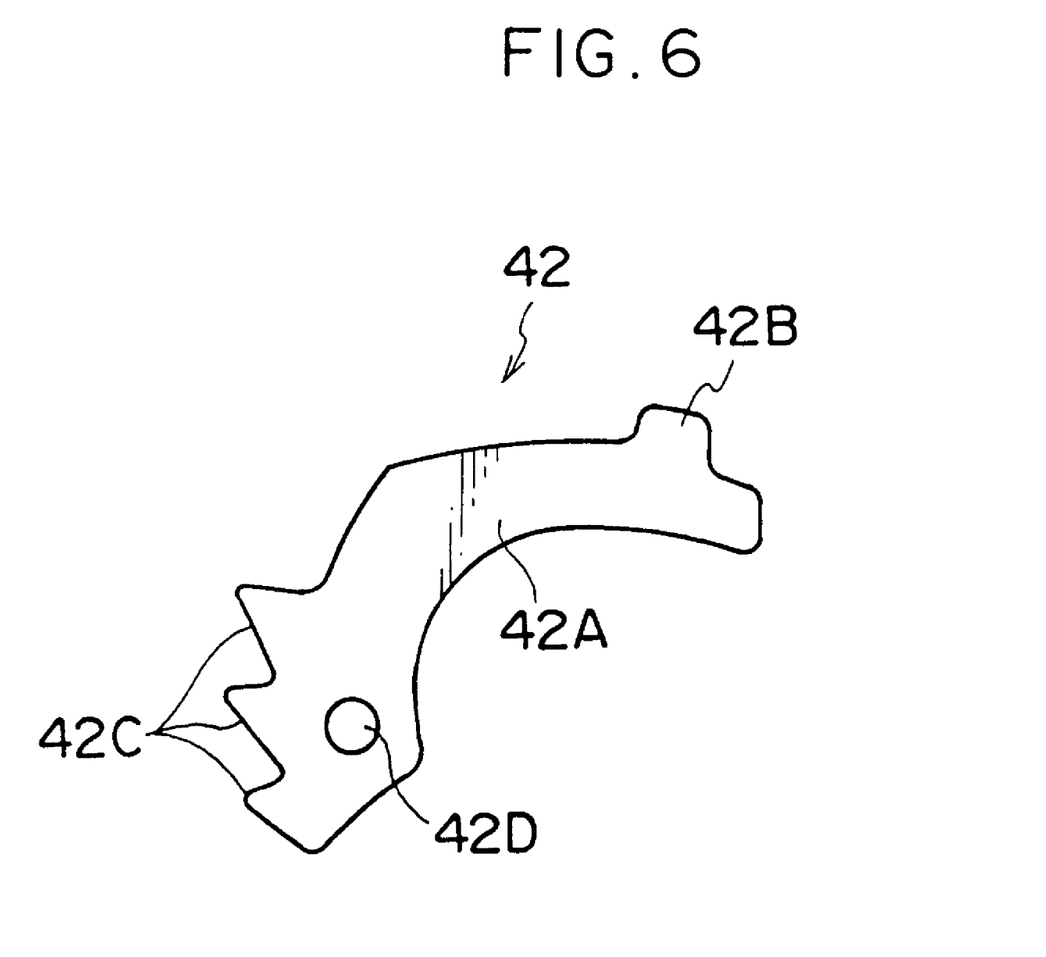
FIG. 6 is a front view of a lock plate shown in FIG. 1.

As illustrated in FIG. 6 and the like, the lock plate 42 is comprised of a metallic plate main body 42A formed as a substantially arc-shaped plate, a rectangular protruding portion 42B extending from one end of the plate main body 42A substantially in a radial direction of the arc, that is, in a direction perpendicular to the plate main body 42A, namely, in a direction in which the lock plate 42 moves, high-strength lock teeth 42C formed in the outer periphery of the other end of the plate main body 42A and meshing with the ratchet teeth 38A of the internal gear ratchet 38 in the first leg plate 16, and a guide pin 42D formed to be upright from the other end of the plate main body 42A. An overall dimension of a transverse dimension of the plate main body 42A and a length extending from the plate main body 42A of the protruding portion 42B schematically coincides with a transverse dimension of a wide portion 40A (see FIGS. 2 and 3) of the accommodating portion 40 of the base lock 24. The "transverse dimension" mentioned above is a dimension in a direction in which the protruding portion 42B is protruded.

Figure 7:
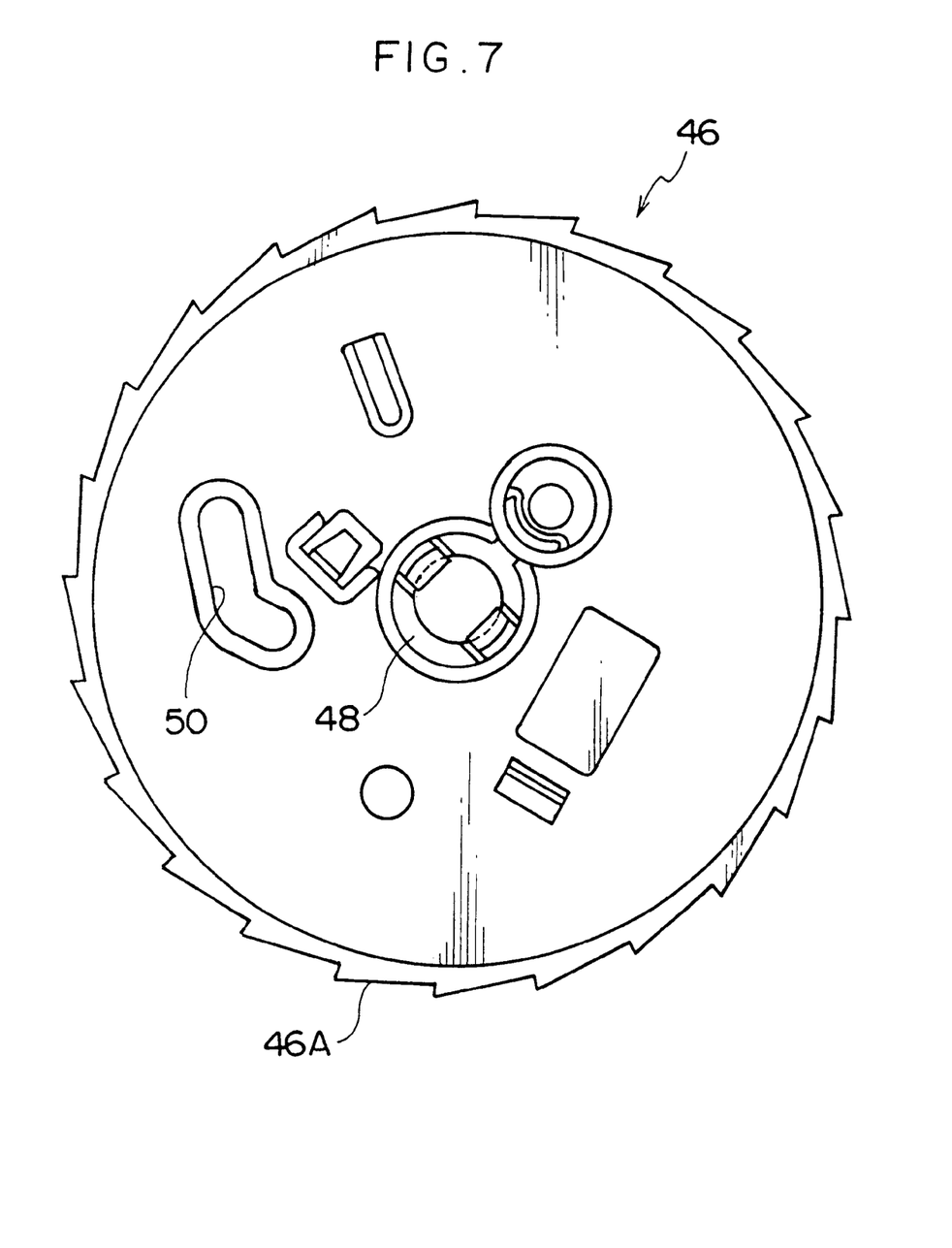
FIG. 7 is a front view of a V gear shown in FIG. 1.

A substantially circular plate-shaped V gear 46 serving as "first lock portion" of which diameter is larger than that of the base lock 24 is disposed adjacent to the base lock 24. As also illustrated in FIG. 7, a cylindrical boss 48 is formed at an axial core portion of the V gear 46 and is supported so as to rotate by following the gear holding portion 36E of the torsion shaft 36. Further, a substantially V-shaped guide hole 50 is formed in the V gear 46 and the guide pin 42D made upright on the lock plate 42 is inserted in the guide hole 50. Moreover, lock teeth 46A are formed in the outer periphery of the V gear 46 so as to be integrated with the V gear 46.

Figure 8:
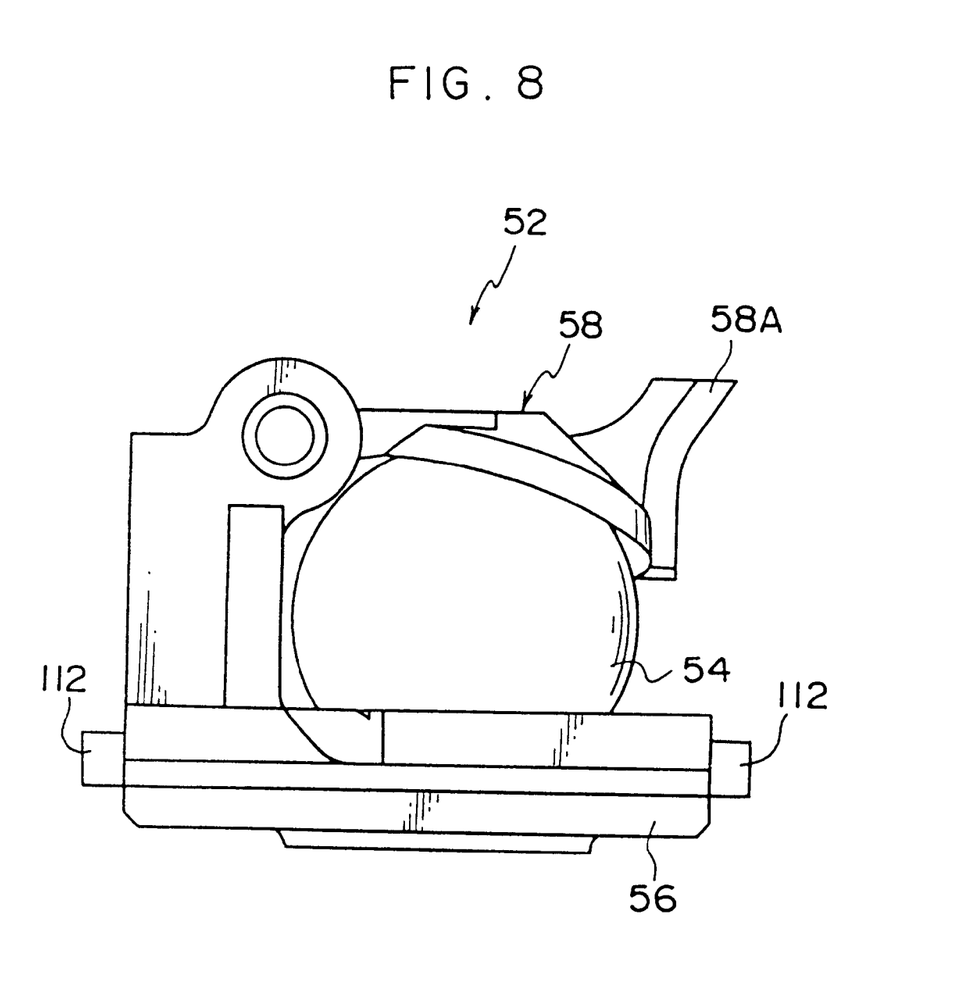
FIG. 8 is a side view of an acceleration sensor not shown in FIG. 1.

A well-known VSIR acceleration sensor 52 shown in FIG. 8 is disposed below the V gear 46. In FIG. 1, the acceleration sensor 52 is not shown. At the time of sudden deceleration of a vehicle, a ball 54 of the acceleration sensor 52 rolls on a sensor housing 56 to swing a sensor lever 58, and a lock pawl 58A of the sensor lever 58 is engaged with the lock tooth 46A of the V gear 46.

Returning to FIG. 1, the above-described acceleration sensor 52 is held by a sensor holder 60 made of resin and serving as a "guide portion". A sensor cover 62 made of resin and having a shape similar to that of the sensor holder 60 is disposed at the outer side of the sensor holder 60. The sensor holder 60 and the sensor cover 62 are integrated and fixed to the first leg plate 16 of the frame 14. A short cylindrical boss 60A is formed at the axial core portion of the sensor holder 60 integrally with the sensor holder 60. The boss 60A supports the end portion 36F of the torsion shaft 36. Namely, the sensor holder 60 is allowed to function as a bearing of the torsion shaft 36. In this sense, the sensor holder 60 is an element which can be used as "bearing member" or "supporting member" in a broad sense. Further, from the another standpoint, the sensor holder 60 can also be used as "holding member" or "cover member".

Internal teeth are formed integrally in the inner periphery of the above-described sensor holder 60 in such a manner as to be engageable with a WSIR pawl (not shown) supported by the above-described V gear 46.

Next, an operation and effects of the present embodiment will be described.

When a tongue plate (not shown) through which a webbing passes is engaged with a buckle device (not shown) by a vehicle occupant, the webbing is pulled out from the spool 12 against urging force of a power spring. The vehicle occupant is brought into a state in which the webbing of a three-point type seat belt apparatus is applied thereto. Namely, a webbing between a shoulder anchor (not shown) disposed above a center pillar and the tongue plate becomes a shoulder-side webbing, and a webbing between the tongue plate and the buckle device becomes a lap-side webbing.

In a case in which a vehicle is caused to travel in the above-described state, at the time of sudden deceleration of the vehicle, a pretensioner (not shown) operates and the spool 12 is instantaneously rotated via the sleeve 34 in the direction in which the webbing is taken up. Simultaneously, the state of sudden deceleration of the vehicle is detected by the acceleration sensor 52. In other words, the ball 54 of the acceleration sensor 52 rolls on the sensor housing 56 to allow the sensor lever 58 to swing. As a result, the lock pawl 58A of the sensor lever 58 is engaged with the lock tooth 46A of the V gear 46 and the rotation of the V gear 46 in the direction in which the webbing is pulled out is prevented.

On the other hand, the spool 12 is about to rotate in the direction in which the webbing is pulled out due to a webbing tension caused by inertia movement of a vehicle occupant. Accordingly, relative rotation is caused between the spool 12 which is about to rotate in the direction in which the webbing is pulled out, and the V gear 46 which is prevented from rotating in the direction in which the webbing is pulled out. When the relative rotation is caused between the spool 12 and the V gear 46, as can be seen from the comparison of FIGS. 2 and 3, the guide pin 42D of the lock plate 42 held in the accommodating portion 40 formed in the holding portion 24C of the base lock 24 is guided by the guide hole 50 of the V gear 46 (that is, the guide pin 42D moves within the guide hole 50), the lock plate 42 is moved outward substantially in a radial direction of the base lock 24. Namely, the lock plate 42 is moved in a direction to which the lock teeth 42C of the lock plate 42 move close to the ratchet teeth. As a result, the lock teeth 42C of the lock plate 42 are engaged with the ratchet teeth 38A of the internal gear ratchet 38 provided in the first leg plate 16 of the frame 14.

When the lock teeth 42C of the lock plate 42 are engaged with the ratchet teeth 38A of the internal gear ratchet 38, reaction force caused by the engagement acts on the holding portion 24C of the base lock 24. The reaction force is caused by engagement between the high-strength lock teeth 42C and the high-strength ratchet teeth 38A at the time of sudden deceleration of a vehicle, and therefore, it becomes a considerably large force. Accordingly, the reaction force naturally acts on the torsion shaft 36 passing through the axial core portion of the base lock 24. Further, the end portion 36F of the torsion shaft 36 is supported by the boss 60A of the sensor holder 60 made of resin, and therefore, the reaction force acts on the boss 60A of the sensor holder 60 from the end portion 36F of the torsion shaft 36, and the boss 60A of the sensor holder 60 elastically deforms in the direction in which the reaction force acts, that is, in the direction opposite to that in which the lock plate 42 is engaged with the ratchet teeth 38A (the direction indicated by arrow P in FIG. 3). As a result, a portion of the outer periphery of the holding portion 24C of the base lock 24 (a region enclosed by the line indicated by arrow P in FIG. 3) is strongly pressed on the ratchet teeth 38A of the internal gear ratchet 38 of the frame 14. The base lock 24 is formed by die casting and is made of a relatively soft material. Accordingly, when the ratchet teeth 38A contacts by pressure the base lock 24, the base lock 24 plastically deforms so that the ratchet teeth 38A bite therein, thereby causing the portion of the outer periphery of the holding portion 24C to be directly engaged with the ratchet teeth 38A. As a result, in the present embodiment, a locked state is obtained based on two facing positions in the radial direction of the holding portion 24C (the internal gear ratchet 38), and therefore, sufficient lock strength can be maintained.

Further, in the present embodiment, the above-described operation and effects can be obtained by using a single lock plate 42, and therefore, the number of parts can be reduced. As a result, as compared with a conventional structure in which two lock plates are used, the weight of the webbing take-up device 10 can be reduced.

Moreover, in the present embodiment, the overall dimension of the transverse dimension of the plate main body 42A in the lock plate 42 and the extending length of the protruding portion 42B is set so as to substantially coincide with the transverse dimension of the wide portion 40A (see FIG. 2) of the accommodating portion 40 of the holding portion 24C of the base lock 24. Therefore, the lock teeth 42C of the lock plate 42 and the ratchet teeth 38A of the internal gear ratchet 38 can reliably be engaged with one another. Namely, during operation of the locking means, the lock plate 42 moves until the protruding portion 42B abuts against an indented portion 40B of the accommodating portion 40 (the indented portion 40B functions as a stopper for the lock plate 42), but it is possible to prevent the actual locus of movement of the lock plate 42 from deviating from a predetermined locus of movement due to the presence of the protruding portion 42B. In other words, it is possible to prevent occurrence of rotational displacement of the lock plate 42 in an undesirable direction, which leads to deficiency in the engagement between the lock teeth 42C (movable teeth) of the lock plate 42 and the ratchet teeth 38A (fixed teeth) of the internal gear ratchet 38. As a result, according to the present embodiment, at the time of sudden deceleration of a vehicle, the lock teeth 42C of the single lock plate 42 and the ratchet teeth 38A of the internal gear ratchet 38 can reliably be engaged with one another. Further, it is also possible to prevent insufficient lock strength which is caused by the deficiency in the engagement. This is of important significance in the locking structure of the present invention having a single lock plate 42 to be engaged with the internal gear ratchet 38.

In the present embodiment, the present invention is applied to the webbing take-up device 10 equipped with a pretensioner and a force limiter, but is not limited to the same. The present invention can also be applied to various types of webbing take-up device.

Further, in the present embodiment, the internal gear ratchet 38 is formed by punching on the first leg plate 16 of the frame 14, but the present invention is not limited to the same. An internal gear ratchet wheel may be fixed, as another component, to the first leg plate 16.

As described above, the webbing take-up device according to the present invention is structured by comprising a frame supported at the side of a vehicle body, a winding shaft rotatably supported by the frame and taking up a vehicle occupant-restraining webbing, and locking means for preventing rotation of the winding shaft in a direction in which the webbing is pulled out at the time of sudden deceleration of a vehicle, wherein the locking means includes: a first lock portion disposed coaxially with the winding shaft and rotating by following the winding shaft, the first lock portion being prevented from rotating in a direction in which the webbing is pulled out at the time of sudden deceleration of the vehicle; a second lock portion disposed coaxially with the winding shaft and rotating integrally with the winding shaft, the second lock portion causing relative rotation between the first lock portion and the second lock portion when rotation of the first lock portion in the direction in which the webbing is pulled out is prevented; a third lock portion which is held by the second lock portion in such a manner as to be movable in a first direction, and when the relative rotation between the first and second lock portions is caused, which moves in the first direction, the third lock portion being comprised of a single component having lock teeth; a fourth lock portion provided in the frame and having lock teeth which are engaged with the lock teeth of the third lock portion when the third lock portion moves in the first direction; and a guide portion which, when the lock teeth of the third lock portion is engaged with the lock teeth of the fourth lock portion, utilizes reaction force generated by engagement between the lock teeth of the fourth lock portion and the lock teeth of the third lock portion so as to displace a predetermined portion of the second lock portion in a direction in which the second lock portion moves close to a predetermined portion of the fourth lock portion, thereby allowing engagement between the predetermined portion of the second lock portion and the predetermined portion of the fourth lock portion, wherein the first direction is that in which the lock teeth of the third lock portion moves close to the lock teeth of the fourth lock portion. Accordingly, the present invention has an excellent effect that the weight of the device can be reduced while maintaining lock strength.

What is claimed is:

1. A webbing take-up device comprising a frame supported at the side of a vehicle body, a winding shaft rotatably supported by the frame and taking up a vehicle occupant-restraining webbing, and locking mechanism for preventing rotation of the winding shaft in a direction in which the webbing is pulled out at the time of sudden deceleration of a vehicle, said locking mechanism including:

a first lock portion disposed coaxially with the winding shaft and rotating by following the winding shaft, said first lock portion being prevented from rotating in a direction in which the webbing is pulled out at the time of sudden deceleration of the vehicle;

a second lock portion disposed coaxially with the winding shaft and rotating integrally with the winding shaft, said second lock portion causing relative rotation between said first lock portion and said second lock portion when rotation of said first lock portion in the direction in which the webbing is pulled out is prevented;

a third lock portion which is held by said second lock portion in such a manner as to be movable in a first direction, and when the relative rotation between said first and second lock portions is caused, which moves in the first direction, said third lock portion being comprised of a single component having lock teeth;

a fourth lock portion provided in the frame and having lock teeth which are engaged with the lock teeth of said third lock portion when said third lock portion moves in the first direction; and a guide portion which, when the lock teeth of said third lock portion is engaged with the lock teeth of said fourth lock portion, utilizes reaction force generated by engagement between the lock teeth of said fourth lock portion and the lock teeth of said third lock portion so as to displace a predetermined portion of said second lock portion in a direction in which said second lock portion moves close to a predetermined portion of said fourth lock portion, thereby allowing engagement between the predetermined portion of said second lock portion and the predetermined portion of said fourth lock portion, wherein the first direction is that in which the lock teeth of said third lock portion moves close to the lock teeth of said fourth lock portion, said guide portion including a deformable bearing portion for supporting said second lock portion, and when said bearing portion deforms due to the reaction force, said guide portion allows the predetermined portion of said second lock portion to be engaged with the predetermined portion of said fourth lock portion.

2. A webbing take-up device according to claim 1, wherein the predetermined portion of said fourth lock portion is a portion provided substantially symmetrical with an engaging portion of said fourth lock portion engaged with the lock teeth of said third lock portion with respect to a rotational axis of said second lock portion, and the predetermined portion of said second lock portion is provided to face the predetermined portion of said fourth lock portion.

3. A webbing take-up device according to claim 1, wherein said third lock portion is held by a holding portion formed in said second lock portion, the holding portion having a wide portion, and includes a protruding portion extending in a second direction at one end thereof and lock teeth at another end thereof, a dimension of the wide portion in the second direction is substantially equal to an overall dimension of a dimension of the protruding portion in the second direction and a dimension of the one end in the second direction, and the second direction is substantially perpendicular to the first direction.

4. A webbing take-up device according to claim 1, wherein each strength of said third lock portion and said fourth lock portion is greater than that of said second lock portion, and when the lock teeth of said third lock portion are engaged with the lock teeth of said fourth lock portion, the predetermined portion of said second lock portion plastically deforms so as to be engaged with the predetermined portion of said fourth lock portion.

5. A webbing take-up device comprising a frame supported at the side of a vehicle body, a winding shaft rotatably supported by the frame and taking up a vehicle occupant-restraining webbing, and locking mechanism for preventing rotation of the winding shaft in a direction in which the webbing is pulled out at the time of sudden deceleration of a vehicle, said locking mechanism including:
  a first lock portion disposed coaxially with the winding shaft and rotating by following the winding shaft, said first lock portion being prevented from rotating in a direction in which the webbing is pulled out at the time of sudden deceleration of the vehicle;
  a second lock portion disposed coaxially with the winding shaft and rotating integrally with the winding shaft, said second lock portion causing relative rotation between said first lock portion and said second lock portion when rotation of said first lock portion in the direction in which the webbing is pulled out is prevented;
  a third lock portion which is held by said second lock portion in such a manner as to be movable in a first direction, and when the relative rotation between said first and second lock portions is caused, which moves in the first direction, said third lock portion being comprised of a single component having lock teeth;
  a fourth lock portion provided in the frame and having lock teeth which are engaged with the lock teeth of said third lock portion when said third lock portion moves in the first direction; and
  a guide portion which, when the lock teeth of said third lock portion is engaged with the lock teeth of said fourth lock portion, utilizes reaction force generated by engagement between the lock teeth of said fourth lock portion and the lock teeth of said third lock portion so as to displace a predetermined portion of said second lock portion in a direction in which said second lock portion moves close to a predetermined portion of said fourth lock portion, thereby allowing engagement between the predetermined portion of said second lock portion and the predetermined portion of said fourth lock portion,
  wherein the first direction is that in which the lock teeth of said third lock portion moves close to the lock teeth of said fourth lock portion,
  wherein said third lock portion is held by a holding portion formed in said second lock portion, and holding portion having a wide portion, and includes a protruding portion extending in a second direction at one end thereof and lock teeth at another end thereof,
  a dimension of the wide portion in the second direction is substantially equal to an overall dimension of a dimension of the protruding portion in the second direction and a dimension of the one end in the second direction, and
  the second direction is substantially perpendicular to the first direction.

6. A webbing take-up device according to claim 5, wherein a guide hole is provided at the first lock portion, and a guide pin is provided at the third lock portion, the guide pin being inserted in the guide hole and moving along the guide hole such that the third lock portion engages with the fourth lock portion at the time of sudden deceleration of the vehicle.

7. A webbing take-up device according to claim 5, wherein, in front view, one end of the holding portion is closed by the second lock portion and another end of the holding portion opens at an outer periphery of the second lock portion such that the holding portion has a substantial concave shape, and the holding portion has a substantial arc shape around a center of the second lock portion.

8. A webbing take-up device according to claim 7, wherein the third lock portion has a substantial arc shape so as to correspond to the substantial arc shape of the holding portion.

9. A webbing take-up device according to claim 5, wherein the third lock portion moves as far as a portion where the protruding portion abuts a stopper portion formed at one end in the first direction of the wide portion.

10. A webbing take-up device comprising a frame supported at the side of a vehicle body, a winding shaft rotatably supported by the frame and taking up a vehicle occupant-restraining webbing, and locking mechanism for preventing rotation of the winding shaft in a direction in which the webbing is pulled out at the time of sudden deceleration of a vehicle, said locking mechanism including:
  a first lock portion disposed coaxially with the winding shaft and rotating by following the winding shaft, said first lock portion being prevented from rotating in a direction in which the webbing is pulled out at the time of sudden deceleration of the vehicle;
  a second lock portion disposed coaxially with the winding shaft and rotating integrally with the winding shaft, said second lock portion causing relative rotation between said first lock portion and said second lock portion when rotation of said first lock portion in the direction in which the webbing is pulled out is prevented;
  a third lock portion which is held by said second lock portion in such a manner as to be movable in a first direction, and when the relative rotation between said first and second lock portions is caused, which moves in the first direction, said third lock portion being comprised of a single component having lock teeth;
  a fourth lock portion provided in the frame and having lock teeth which are engaged with the lock teeth of said third lock portion when said third lock portion moves in the first direction; and
  a guide portion which, when the lock teeth of said third lock portion is engaged with the lock teeth of said fourth lock portion, utilizes reaction force generated by engagement between the lock teeth of said fourth lock portion and the lock teeth of said third lock portion so as to displace a predetermined portion of said second lock portion in a direction in which said second lock portion moves close to a predetermined portion of said fourth lock portion, thereby allowing engagement between the predetermined portion of said second lock portion and the predetermined portion of said fourth lock portion,
  wherein the first direction is that in which the lock teeth of said third lock portion moves close to the lock teeth of said fourth lock portion, wherein said third lock portion is held by a holding portion formed in said second lock portion, and holding portion having a wide portion, and includes a protruding portion extending in a second direction at one end thereof and lock teeth at another end thereof, a dimension of the wide portion in the second direction is substantially equal to an overall dimension of a dimension of the protruding portion in the second direction and a dimension of the one end in the second direction, and the second direction is substantially perpendicular to the first direction, wherein the one end of the third lock portion including the protruding portion moves within and along the wide portion of the holding portion in the first direction such that the third lock portion moves along a predetermined locus.

* * * * *